(12) United States Patent
Okudo et al.

(10) Patent No.: US 11,320,372 B2
(45) Date of Patent: May 3, 2022

(54) COMPONENT SENSOR

(71) Applicant: Panasonic Intellectual Property Management Co., Ltd., Osaka (JP)

(72) Inventors: Takafumi Okudo, Osaka (JP); Shinichi Kishimoto, Osaka (JP); Masahiko Ohbayashi, Osaka (JP); Koji Sakai, Hyogo (JP); Hiroki Yoshino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 205 days.

(21) Appl. No.: 16/639,148

(22) PCT Filed: Oct. 25, 2018

(86) PCT No.: PCT/JP2018/039656
§ 371 (c)(1),
(2) Date: Feb. 14, 2020

(87) PCT Pub. No.: WO2019/093143
PCT Pub. Date: May 16, 2019

(65) Prior Publication Data
US 2020/0232917 A1    Jul. 23, 2020

(30) Foreign Application Priority Data
Nov. 7, 2017 (JP) .............................. JP2017-214414

(51) Int. Cl.
*G01N 21/552* (2014.01)
*G01J 3/42* (2006.01)
(Continued)

(52) U.S. Cl.
CPC .............. *G01N 21/552* (2013.01); *G01J 3/42* (2013.01); *G01J 5/08* (2013.01); *G01J 5/58* (2013.01);
(Continued)

(58) Field of Classification Search
CPC .................................................... G01N 21/552
(Continued)

(56) References Cited

U.S. PATENT DOCUMENTS 6,096,564 A * 8/2000 Denes ...................... A61L 2/14
                                                    438/1
6,819,811 B1 * 11/2004 Goldstein .............. B82Y 30/00
                                                    385/12
(Continued)

FOREIGN PATENT DOCUMENTS

CN          1877302 A  * 12/2006  ............. G01N 21/05
JP          57-111423       7/1982
(Continued)

OTHER PUBLICATIONS

International Search Report of PCT application No. PCT/JP2018/039656 dated Dec. 11, 2018.

*Primary Examiner* — Tarifur R Chowdhury
*Assistant Examiner* — Omar H Nixon
(74) *Attorney, Agent, or Firm* — McDermott Will & Emery LLP

(57) ABSTRACT

A component sensor detects a fluid component with improved accuracy. The component sensor includes tube (3) including tube side (4) that permits inflow of fluid (2), substrate (5) provided to tube (3), first protrusion (6) provided at one end of substrate (5), second protrusion (7) provided at another end of substrate (5), light emitter (9) that emits infrared light (8) toward first protrusion (6), and light receiver (10) that receives infrared light (8). Infrared light (8) entering substrate (5) through first protrusion (6) experiences total reflection inside substrate (5) and exits through second protrusion (7) to head for light receiver (10). Tube side (4) includes two through holes (13) that each extend between an interior and an exterior of tube (3). Substrate (5) is inserted into through holes (13) with a central part of (Continued)

substrate (5) being inside tube (3) and with the one end and the other end of substrate (5) that are respectively provided with first protrusion (6) and second protrusion (7) being outside tube (3).

8 Claims, 3 Drawing Sheets

(51) Int. Cl.
  *G01J 5/08* (2022.01)
  *G01J 5/58* (2022.01)
  *G01N 21/03* (2006.01)
  *G01N 21/27* (2006.01)
  *G01N 21/35* (2014.01)

(52) U.S. Cl.
  CPC ............ *G01N 21/03* (2013.01); *G01N 21/27* (2013.01); *G01N 21/35* (2013.01)

(58) Field of Classification Search
  USPC .......................................... 356/445
  See application file for complete search history.

(56) References Cited

U.S. PATENT DOCUMENTS

| | | | |
|---|---|---|---|
| 9,897,541 B1* | 2/2018 | Sperling | G01N 21/552 |
| 2003/0157725 A1* | 8/2003 | Franzen | G01N 21/552 |
| | | | 436/171 |
| 2004/0108472 A1* | 6/2004 | Maruo | G01N 21/552 |
| | | | 250/504 R |
| 2005/0141843 A1* | 6/2005 | Warden | G01N 21/47 |
| | | | 385/141 |

FOREIGN PATENT DOCUMENTS

| | | | | |
|---|---|---|---|---|
| JP | 57-111435 | 7/1982 | | |
| JP | 7-020046 | 1/1995 | | |
| WO | WO-03073069 A1 * | 9/2003 | ............ | G01N 21/05 |

* cited by examiner

COMPONENT SENSOR

CROSS-REFERENCE TO RELATED APPLICATIONS

This application is a U.S. national stage application of the PCT International Application No. PCT/JP2018/039656 filed on Oct. 25, 2018, which claims the benefit of foreign priority of Japanese patent application 2017-214414 filed on Nov. 7, 2017, the contents all of which are incorporated herein by reference.

FIELD OF THE INVENTION

The present disclosure relates to a device such as a fluid component detector that detects a level of a fluid component by utilizing a light absorption property such as an infrared absorption property.

DESCRIPTION OF THE RELATED ART

A conventionally used component sensor includes a pipe through which fluid flows. A component sensor that uses a prism and an attenuated total reflection (ATR) method is known (PTL 1). A component sensor also known to use the ATR method has an infrared transmitting fiber passed through an interior of a sample container to achieve improved fluid component measurement performance (PTL 2 or 3).

CITATION LIST

Patent Literatures

PTL 1: Unexamined Japanese Patent Publication No. H07-020046
PTL 2: Unexamined Japanese Patent Publication No. S57-111423
PTL 3: Unexamined Japanese Patent Publication No. S57-111435

SUMMARY OF THE INVENTION

However, the component sensor disclosed in PTL 1 needs to be larger in size to achieve high sensitivity. While the conventional component sensor disclosed in PTL 2 or 3 can achieve, without becoming larger in size, improved sensitivity with an increased number of infrared absorptions, the infrared transmitting fiber being used is deformed by a moving sample, so that a component to be detected is detected with low accuracy.

Therefore, the present disclosure aims at solving the above problems and providing a component sensor that detects a target with improved accuracy.

To solve the above problems, a component sensor according to the present disclosure is configured as follows. The component sensor includes a tube including a tube side that allows a fluid to enter the tube, a substrate provided to the tube, a first protrusion provided at one end of the substrate, a second protrusion provided at another end of the substrate, a light emitter that emits infrared light toward the first protrusion, and a light receiver that receives the infrared light. The infrared light entering the substrate through the first protrusion experiences total reflection inside the substrate and exits through the second protrusion to head for the light receiver. The tube side is provided with two through holes that each extend between an interior and an exterior of the tube. The substrate is inserted into the through holes with a central part of the substrate being inside the tube. The one end and the other end of the substrate that are respectively provided with the first protrusion and the second protrusion are outside the tube.

Because of the above structure in which the substrate pierces through the tube, the present disclosure enables the component sensor to have improved sensitivity. The present disclosure also enables improved accuracy of detection of a component to be detected because the substrate that transmits the infrared light experiences less deformation.

DETAILED DESCRIPTION OF THE PREFERRED EMBODIMENTS

Exemplary Embodiment

With reference to the drawings, a description is hereinafter provided of a component sensor according to the exemplary embodiment of the present disclosure.

Figure 1:
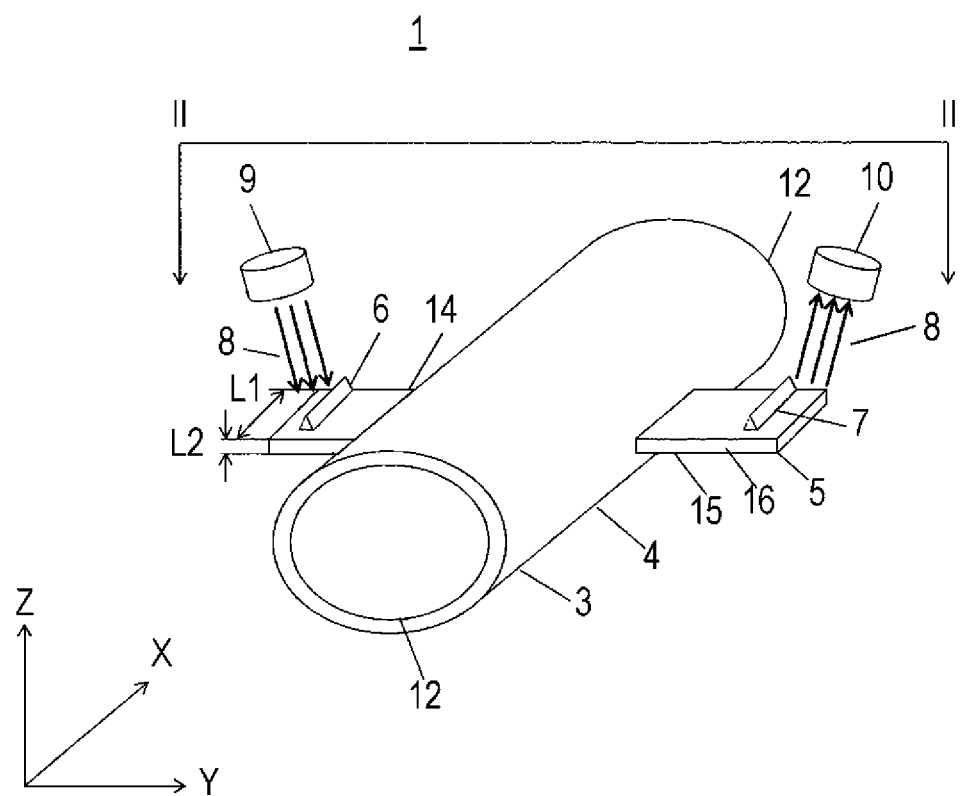
FIG. 1 is a perspective view of a component sensor according to an exemplary embodiment of the present disclosure.
Figure 2:
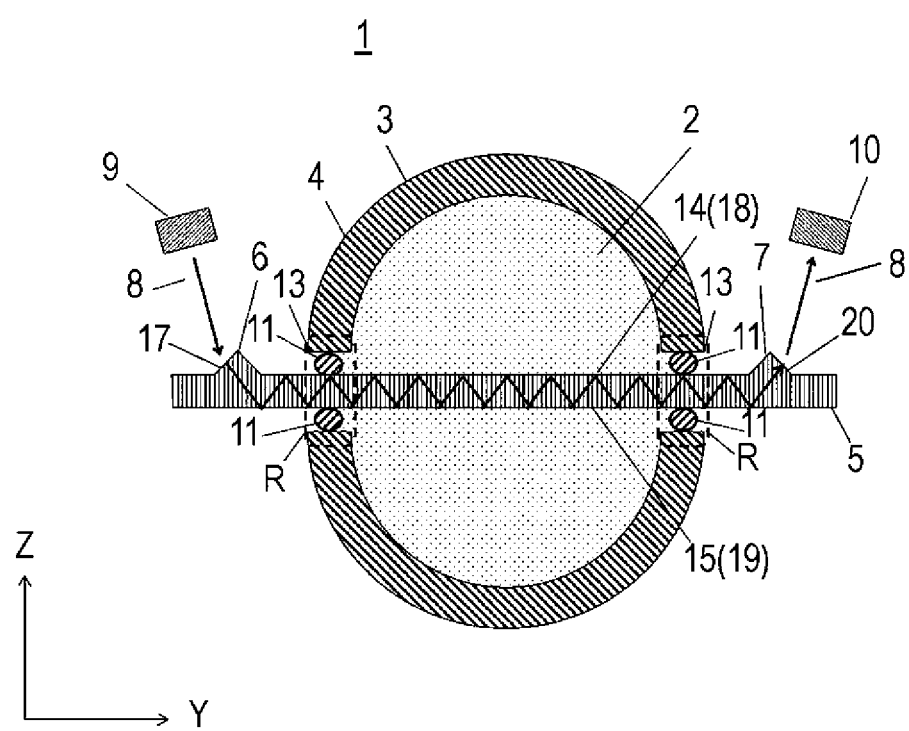
FIG. 2 is a sectional view of the component sensor, the section being taken along line II-II.

FIG. 1 is a perspective view of the component sensor according to the exemplary embodiment. FIG. 2 is a sectional view of the component sensor, the section being taken along line II-II. A path of infrared light is indicated by straight lines. FIG. 2 illustrates a fluid which undergoes detection.

Component sensor 1 according to the exemplary embodiment includes tube 3 that permits inflow of fluid 2 which undergoes the detection, substrate 5 piercing through tube side 4 of tube 3 with both its ends being outside tube 3, first protrusion 6 provided at one of the ends of substrate 5, second protrusion 7 provided at the other end of substrate 5, light emitter 9 that emits infrared light 8 toward first protrusion 6, and light receiver 10 that receives infrared light 8 exiting through second protrusion 7. Substrate 5 is sealed to tube 3 by means of sealing members 11. Fluid 2 that undergoes detection is conceivably motor fuel. The fuel contains, for example, hydrocarbonaceous components, ethanol, and water. The hydrocarbonaceous components are, for example, aromatic, olefinic, and paraffinic. If levels of these fuel components are detected, improvement of fuel efficiency of an internal combustion engine and reduction of exhaust emissions, for example, can be achieved. Fluid 2 that undergoes detection, however, is not limited to this, and another fluid 2 may be used for detection of its component. An extending direction of tube 3 is hereinafter described as an X-axis direction, a direction connecting the ends of substrate 5 that project from tube 3 is hereinafter described as a Y-axis direction, and a direction orthogonal to both the X-axis and Y-axis directions is hereinafter described as a Z-axis direction.

Tube 3 is formed to be cylindrical and extends in the X-axis direction. Fluid 2 flows inside tube 3, so that a direction in which fluid 2 flows inside tube 3 is described as the extending direction of tube 3 in the description of component sensor 1. Tube 3 is not limited to being cylindrical and may be curved in shape. However, cylindrical tube 3 illustrated in FIG. 1 is used in the description of the exemplary embodiment. A section of tube 3 that is taken along a YZ plane is not limited to being circular in shape and may be, for example, elliptic, rectangular, or polygonal in shape. Tube 3 is provided with terminal openings 12 in the X-axis direction. Fluid 2 which undergoes the detection flows into or out from opening 12. Tube 3 has tube side 4 between two openings 12. Tube side 4 is provided with two through holes 13 that permit insertion of substrate 5, and substrate 5 is inserted into through holes 13. Substrate 5 has, in the Y-axis direction, a central part disposed inside tube 3. The one end and the other end of substrate 5 that are respectively provided with first protrusion 6 and second protrusion 7 are disposed outside tube 3 along the Y-axis direction.

Substrate 5 is made of silicon and has first principal surface 14, second principal surface 15, which is a back surface opposite from first principal surface 14, and substrate sides 16 positioned between first and second principal surfaces 14 and 15. Although silicon is not the only material for substrate 5, substrate 5 can be processed with ease when made of silicon. Areas of substrate 5 that are disposed outside tube 3 are provided with first protrusion 6 and second protrusion 7, respectively. First and second protrusions 6 and 7 are provided on first principal surface 14 of substrate 5 to be positioned on opposite sides of tube 3. First protrusion 6, tube 3, and second protrusion 7 of component sensor 1 are arranged in order in the Y-axis direction. Although first and second protrusions 6 and 7 are provided on first principal surface 14 of substrate 5, this is not limiting. For example, first protrusion 6 may be provided on first principal surface 14, while second protrusion 7 may be provided on second principal surface 15. First protrusion 6 and second protrusion 7 are prisms. First and second protrusions 6 and 7 are provided integrally with substrate 5 and thus can be formed with ease. First protrusion 6 is provided with first slope 17. Infrared light 8 enters substrate 5 through first slope 17 of first protrusion 6. Substrate 5 has a higher refractive index than fluid 2. For this reason, infrared light 8 entering substrate 5 through first protrusion 6 repeatedly experiences total reflection at first boundary surface 18 between first principal surface 14 of substrate 5 and fluid 2 as well as at second boundary surface 19 between second principal surface 15 and fluid 2 while heading for second protrusion 7. Infrared light 8 reaching second protrusion 7 exits substrate 5 through second slope 20 of second protrusion 7. First slope 17 and second slope 20 are formed by anisotropic etching. The anisotropic etching enables easy formation of first and second slopes 17, 20. When a (100) wafer is used as substrate 5, first slope 17 and second slope 20 become (111)-oriented planes each making angle θ of 54.7° with second principal surface 15. If each of first and second slopes 17 and 20 makes angle θ of 54.7° with second principal surface 15, infrared light 8 experiences total reflection at first and second boundary surfaces 18 and 19 each between substrate 5 and fluid 2. Angle θ which first and second slopes 17 and 20 each make with second principal surface 15 may be other than 54.7°; however, the process can be easier to make first and second slopes 17 and 20 if angle θ is 54.7°.

Substrate 5 pierces through tube 3. Therefore, when infrared light 8 experiences the total reflection at first and second boundary surfaces 18 and 19, an evanescent wave penetrates into fluid 2 outwardly of substrate 5 and is attenuated by being absorbed by fluid 2. Detection of this attenuation enables detection of the component of fluid 2. Because silicon is used for substrate 5 of component sensor 1, substrate 5 is difficult to deform even under pressure of fluid 2. Therefore, compared with a conventional component sensor such as the one described in PTL 2 or 3, component sensor 1 has a small decline in detection accuracy that might be caused by deformation of substrate 5. Since infrared light 8 is absorbed by fluid 2 both at first and second boundary surfaces 18 and 19, an amount of infrared absorption is larger than when infrared light 8 is structurally absorbed only at either first principal surface 14 or second principal surface 15 as illustrated by the prior art in PTL 1. The amount of infrared absorption thus is doubled while infrared light 8 travels the same optical path length as infrared light 8 travels in the conventional component sensor. Therefore, component sensor 1 can have improved sensitivity. Because a length of substrate 5 can be halved with the sensitivity of component sensor 1 maintained, component sensor 1 can be miniaturized.

Figure 3:
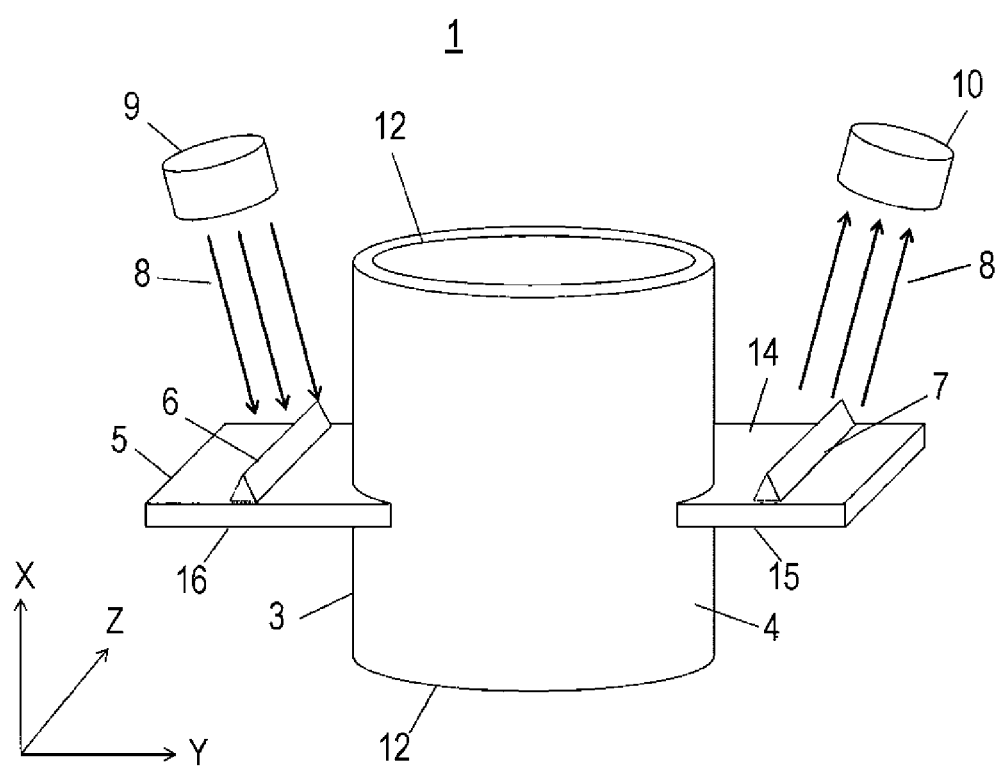
FIG. 3 is a perspective view of a modified example of the component sensor.

Each of first and second principal surfaces 14 and 15 has length L1 along a direction connecting two substrate sides 16 (length L1 is hereinafter described as a width of first principal surface 14 or second principal surface 15). This length L1 is greater than substrate side length L2 along a direction connecting first and second principal surfaces 14 and 15 (length L2 is hereinafter described as a width of each of substrate sides 16). It is to be noted that width L1 of first principal surface 14 and width L1 of second principal surface 15 are described as being equal for convenience of explanation, but are not limited to this. First principal surface 14 and second principal surface 15 are provided to parallel the extending direction (X-axis direction) of tube 3. Since width L1 of first principal surface 14 and width L1 of second principal surface 15 are each greater than width L2 of substrate side 16, when disposed with its first and second principal surfaces 14 and 15 paralleling the X-axis direction, substrate 5 can receive reduced pressure from fluid 2. Substrate 5 thus can undergo suppressed deformation under the pressure exerted by fluid 2. Therefore, component sensor 1 can have a suppressed decline in detection accuracy. FIG. 3 is a perspective view of a component sensor having differently disposed substrate 5. Although substrate 5 may be disposed with first principal surface 14 being orthogonal to the X-axis direction (with first and second principal surfaces 14 and 15 paralleling the YZ plane) as illustrated in FIG. 3, disposing substrate 5 so that first principal surface 14 is not orthogonal to the X-axis direction can reduce pressure of fluid 2. When disposed particularly with first principal surface 14 paralleling the X-axis direction as illustrated in FIG. 1, substrate 5 receives suitably minimized pressure from fluid 2. If tube 3 is curved, similar effects can be obtained when substrate 5 is disposed to receive minimized pressure from fluid 2.

Sealing members 11 are used to seal substrate 5 in seal regions R where through holes 13 are respectively provided. Used for sealing members 11 is metallic packing covered with a reflective film of gold, silver, or the like (not illustrated) that easily reflects infrared light 8. With sealing members 11 being covered with gold or silver, infrared light 8 experiences less attenuation when reflecting in the seal regions R where sealing members 11 are used for sealing. Infrared light 8 may be attenuated by being absorbed by sealing members 11 when reflecting in the seal regions, and component sensor 1 may have correspondingly reduced sensitivity. However, with sealing members 11 being covered with gold or silver as in component sensor 1, infrared absorption by sealing members 11 can be suppressed, so that component sensor 1 can have improved sensitivity. It is to be noted that in order to prevent infrared reflection in seal regions R, an angle of infrared light 8 may be adjusted through adjustment of relative positions of light emitter 9 and first protrusion 6. When infrared light 8 is incident at such an angle, sealing members 11 do not absorb infrared light 8, so that component sensor 1 can have improved sensitivity.

A platinum film resistance element that is capable of emitting infrared light 8 is used as light emitter 9. A light-emitting diode that is capable of emitting infrared light 8 may be used instead. A semiconductor bare chip may be used as the light-emitting diode. Light emitter 9 is provided near first principal surface 14 of substrate 5 so that infrared light 8 is incident on first protrusion 6. Light emitter 9 emits infrared light 8 including a wavelength that is easily absorbed by fluid 2 that undergoes detection. Component sensor 1 uses infrared light 8 having those wavelengths ranging from 2 μm to 15 μm inclusive. The use of these wavelengths enables accurate detection of a level to be detected in fluid 2. It is to be noted that the wavelengths to be used may range more narrowly depending on intended use of component sensor 1. The wavelength range can be narrowed, for example, by means of an optical bandpass filter (not illustrated) that is consistent with an absorption wavelength specific to the fluid component to be measured. It is to be noted that light emitter 9 may include two or more light sources of different wavelengths. Use of the plurality of light sources enable detection of a plurality of component kinds in fluid 2.

Semiconductor bare chips are used for light receiver 10. Elements other than the semiconductor bare chips, such as pyroelectric elements or photodiodes, may be used for light receiver 10. Light receiver 10 is disposed in a position that enables detection of infrared light 8 exiting through second protrusion 7 on a substrate side of tube 3. Light receiver 10 includes two light receiving elements (not illustrated) and two optical filters (not illustrated) positioned to respectively correspond to the two light receiving elements. The two optical filters each transmit infrared light 8 including a different wavelength. One of the optical filters transmits infrared light 8 including the wavelength at which fluid 2 absorbs a large amount, while the other optical filter transmits infrared light 8 including the wavelength at which fluid 2 absorbs a small amount. The amount of infrared absorption by fluid 2 can be determined based on comparison between respective outputs of the two light receiving elements, so that the component of fluid 2 can be detected accurately. Although component sensor 1 uses the two light receiving elements and the two optical filters for the accurate detection of the component of fluid 2, it is to be noted that the component of fluid 2 can be detected even if one light receiving element and one optical filter are used. It is also to be noted that three or more light receiving elements and three or more optical filters may be provided. With an increased number of light receiving elements and an increased number of optical filters, an increased number of components kinds can be detected.

Although not illustrated, light emitter 9 and light receiver 10 are housed in a casing when mounted to tube 3 and are fixed so that infrared light 8 enters substrate 5 through first protrusion 6 and exits through second protrusion 7 to head for light receiver 10.

A component sensor according to the present disclosure can detect a fluid component with high accuracy and thus is suitable for detection of a level of a motor fuel component.

The invention claimed is:

1. A component sensor comprising:
   a tube that allows a fluid to enter the tube and includes a tube side;
   a substrate provided to the tube;
   a first protrusion provided at one end part of the substrate;
   a second protrusion provided at another end part of the substrate;
   a light emitter that emits infrared light toward the first protrusion; and
   a light receiver that receives the infrared light,
   wherein the substrate has a first principal surface, a second principal surface opposite to the first principal surface and side surfaces positioned between the first and second principal surfaces, and the fluid is in touch with the first principal surface and the second principal surface,
   wherein the component sensor is configured such that the infrared light entering the substrate through the first protrusion experiences total reflection on the first principal surface and the second principal surface only inside the substrate and exits through the second protrusion to head for the light receiver, and the infrared light is partially absorbed at the first principal surface and the second principal surface,
   wherein the tube side includes two through holes, and
   wherein the substrate is inserted into the two through holes such that a central part of the substrate is located inside the tube, the one end part, the another end part of the substrate, the first protrusion and the second protrusion are located outside the tube.

2. The component sensor according to claim 1, wherein: the first principal surface is not orthogonal to an extending direction of the tube.

3. The component sensor according to claim 2, wherein the first principal surface is parallel to the extending direction of the tube.

4. The component sensor according to claim 1, wherein: spaces between the substrate and the tube are sealed by a sealing member, and
   a reflective film is provided on a surface of the sealing member.

5. The component sensor according to claim 2, wherein: a length L1 that is a width of the first principal surface along a first direction crossing a second direction that is a direction from the one end part to the another end part and a length L2 that is a distance between the first principal surface and the principal surface satisfy L1>L2.

6. The component sensor according to claim 1, wherein the substrate is made of Si.

7. The component sensor according to claim 6, wherein the first and second protrusions include a (111) surface of silicon.

8. The component sensor according to claim 1, wherein the first protrusion and the second protrusion are provided on one of the first principal surface or the second principal surface.

* * * * *